May 14, 1935.  W. E. BALOUSEK  2,000,911
PLANT SUPPORT
Filed April 3, 1933
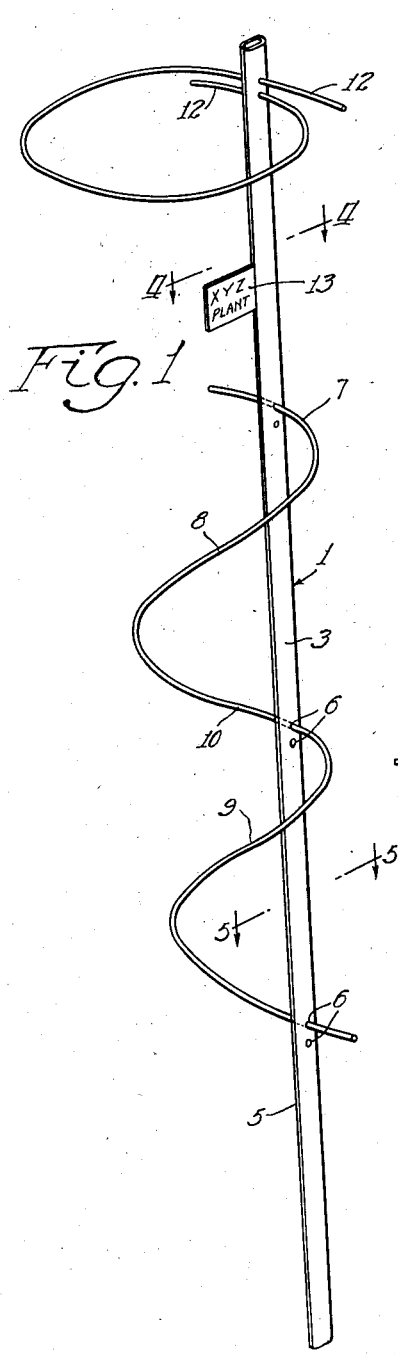
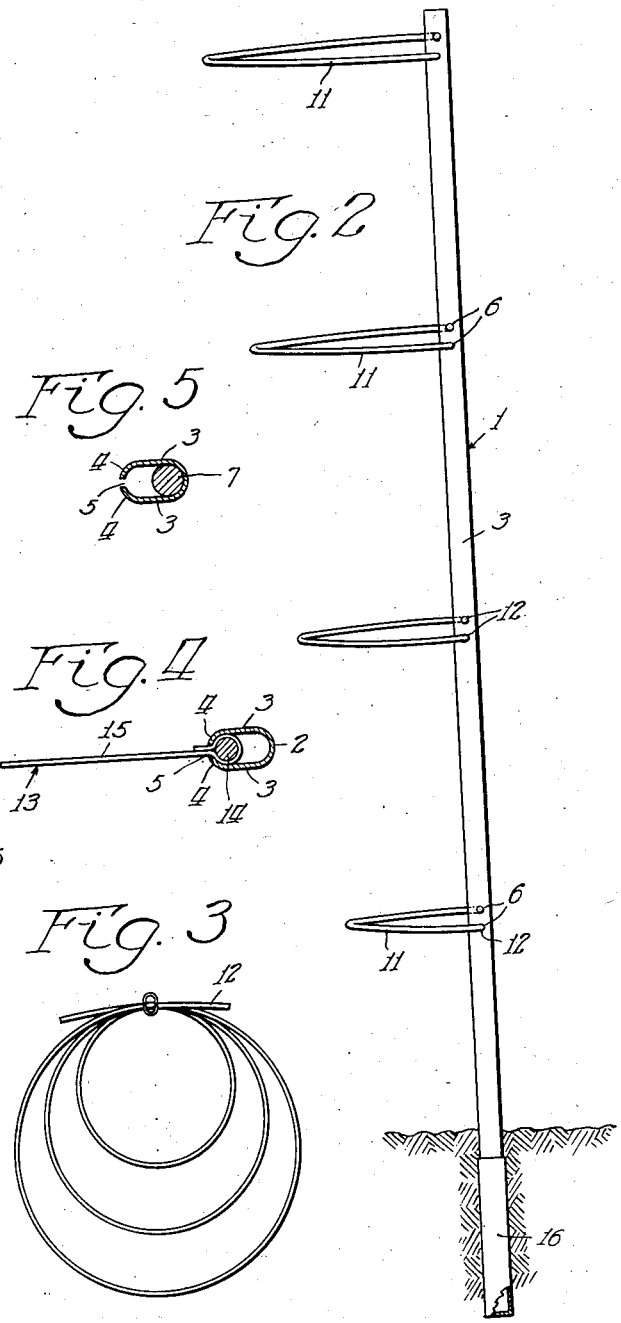
Inventor
William E. Balousek
By:
Hill Hill  Attys.
Witness:
V. Siljander Patented May 14, 1935

2,000,911

UNITED STATES PATENT OFFICE 2,000,911

PLANT SUPPORT

William E. Balousek, Chicago, Ill., assignor to W. J. Dennis & Company, Chicago, Ill., a corporation of Illinois Application April 3, 1933, Serial No. 664,154

3 Claims. (Cl. 47—47)

My invention relates generally to supports and particularly concerns a device which is adapted to provide an arrangement or otherwise a support for plants.

One of the principal objects of my invention is to provide a plant support which includes a stake provided with a plurality of apertures and a strip or length of material which is adapted to be extended or otherwise threaded through any of the various apertures in order to provide an arrangement of a character to support a plant.

Another object of my invention is to provide a structure of the kind just referred to in which the strip of material may be extended or otherwise threaded through any of the various apertures to provide an arrangement including one or more convolutions joined together, or independent convolutions extending laterally of the axis of the stake to thus provide an arrangement for supporting a plant.

Another object of my invention is to design and construct a device in which the strip of material above referred to is of a character whereby the same may be flexed or arranged to assume any of a plurality of shapes or sizes, thus providing an arrangement susceptible of receiving or otherwise surrounding and supporting different kinds of plants.

A further object of my invention is to design and construct a device of the kind described of which the stake thereof is adapted to receive or hold a strip or strips of material, which strip or strips when removed from the stake may be threaded or otherwise extended through any of the various apertures provided in the stake to provide an arrangement which may be adjusted in accordance with the kind of plant to be supported.

A still further object of my invention is to construct a device of the kind referred to in which the stake thereof is of a tubular character and which is provided with a slot which is of a character to receive a label for identifying the plant to be supported.

Additional objects and advantages derived from use of the device will be apparent after referring to and considering the description hereinafter set forth in connection with the drawing annexed hereto, wherein the elements comprising the device are shown and identified by certain numerals.

Fig. 1 is a perspective view in elevation disclosing one of the assembled arrangements of which my invention is susceptible;

Fig. 2 is a view in elevation similar to Fig. 1, dsclosing a modified arrangement to which the invention is susceptible;

Fig. 3 is a top plan view of Fig. 2;

Fig. 4 is a sectional view taken on line 4—4 of Fig. 1 showing the construction of a label which may be associated with the stake as clearly shown in Fig. 2; and Fig. 5 is an enlarged section taken on line 5—5 of Fig. 1, and clearly discloses the manner in which the strip or strips are arranged within the tubular stake.

Considering the invention as illustrated in the drawing and the details thereof, I generally designates a stake which may be constructed of any size or shape and of any suitable material. The stake, however, in its preferred form contemplates the utilization of a member of tubular construction and as clearly shown, includes a base portion 2, and side walls 3, which are integral with base 2 and extend transversely therefrom. The free edges of the side walls 3 are preferably formed to provide portions such as 4 which extend substantially transverse to the walls 3 toward each other so as to provide a longitudinal slot 5 which extends preferably the full length of the stake. Intermediate the ends of the stake and preferably in the side walls 3 thereof, are provided a plurality of groups of apertures such as 6. It will be noted that the apertures forming each group are closely related, one being arranged opposite the other, and extending lengthwise of the stake.

As above referred to, one of the principal objects of my invention is to provide a stake preferably of tubular form in order to provide a holder for the strip of material which is adapted to be flexed or otherwise extended through any of the various apertures provided in the stake; and with this object in view, I have arranged or otherwise confined within the stake a strip of material 7 which may consist either of a reed, wire or other material susceptible for the purpose. The character of the strip of material 7 is such that it will be frictionally held within the confines of the stake. This frictional engagement may be effected innumerable ways such as by modifying the shape either of the strip 7 or stake 1 or both.

Referring particularly to Figs. 1 and 2, it will be clearly evident that the strip of material 7, after being removed from the stake may be flexed and threaded or otherwise extended through any of the various apertures provided in the stake so as to provide a number of convolutions such as 8 and 9, which are joined together by means of a portion 10. If desired a number of short strips of material may be flexed so as to provide a number of independent convolutions or arrangements such as 11, the ends 12 of each convolution extending through the groups of apertures 6. Obviously the various arrangements or convolutions shown, are few of many to which the invention is susceptible. Obviously, the strip 7 is of a character whereby the size or shape of the arrangement may be adjusted so as to receive, surround or otherwise make the device susceptible to receive plants of various sizes or shapes.

With reference to Fig. 4 of the drawing, I have disclosed a label generally designated 13 which may be provided to identify the particular plant that is to be supported by the device. The label generally designated 13 may be of any suitable design and construction, however, in the present embodiment, it preferably includes a member 14 and a tag 15, the latter of which may be secured to member 14 in any suitable manner. The member 14 is preferably of a durable character and the tag 15 is preferably formed of rubber or some other material impervious to moisture. It will be noted that the stake is of a character whereby either end may be driven into the soil and to prevent the soil from clogging the end which is driven into the soil, a tubular cap such as 16 may be arranged to frictionally engage and close such end.

Having thus described my invention, it is obvious that various immaterial modifications may be made in the same without departing from the spirit of my invention; hence I do not wish to be understood as limiting myself to the exact form, construction, and arrangements of parts herewith shown and described, or uses mentioned.

What I claim as new and desire to secure by Letters Patent is:

1. A plant support comprising a tubular stake having a slot along one side thereof, a strip of material arranged and frictionally held within said stake, a plurality of apertures provided in said stake in a manner whereby the strip when detached may be extended through the apertures desired and provide an arrangement which may be varied in accordance with the kind of plant to be supported, and a label for identifying the plant slidably adjustable in said slot.

2. A plant support comprising a tubular member providing a stake or post, said tubular member having a plurality of transverse apertures arranged in vertically spaced-apart relation, and a resilient flexible strip mounted on said stake by projecting the strip through a plurality of said apertures, the portion of the strip outside of said apertures being maintained by its resiliency in spaced-apart relation to the tubular member.

3. A plant support comprising a hollow tubular member providing a stake or post, said tubular member having a plurality of apertures in its side walls arranged in pairs substantially in register, said pairs of apertures being arranged in spaced-apart vertical relation, and a resilient flexible strip mounted on said stake by projecting the strip through a plurality of said pairs of apertures, the portion of the strip outside of said apertures being maintained by its resiliency in spaced relation to the tubular member.

WILLIAM E. BALOUSEK.